United States Patent
Yamamoto et al.

(10) Patent No.: US 7,751,143 B2
(45) Date of Patent: Jul. 6, 2010

(54) HEAD POSITION CONTROL METHOD, HEAD POSITION CONTROL DEVICE, AND MAGNETIC RECORDING EVALUATION APPARATUS

(75) Inventors: Yukio Yamamoto, Toride (JP); Yoshihiro Sakurai, Hadano (JP); Kunihito Higa, Nakai (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/369,787

(22) Filed: Feb. 12, 2009

(65) Prior Publication Data
US 2009/0284862 A1 Nov. 19, 2009

(30) Foreign Application Priority Data
May 16, 2008 (JP) ............................. 2008-129331

(51) Int. Cl.
*G11B 5/596* (2006.01)
*G11B 27/36* (2006.01)

(52) U.S. Cl. .................. 360/77.02; 360/31; 360/77.06; 360/77.11

(58) Field of Classification Search ........................ None
See application file for complete search history.

(56) References Cited

U.S. PATENT DOCUMENTS
2004/0047066 A1* 3/2004 Shigematsu .............. 360/77.04
2009/0268337 A1* 10/2009 Sudo ....................... 360/77.02

FOREIGN PATENT DOCUMENTS
JP 2004-192733 7/2004

* cited by examiner

Primary Examiner—Andrew L Sniezek
(74) Attorney, Agent, or Firm—Antonelli, Terry, Stout & Kraus, LLP.

(57) ABSTRACT

A magnetic head position control method is provided to control a magnetic head to follow the track on a DTM (discrete-track magnetic) disk by accurately detecting the eccentricity compensation amount through a simple process. An angle detection unit detects $\theta 1$ at which the relative displacement between the magnetic head and the tracks on the DTM (discrete-track magnetic) disk has a peak with no vibration data added. A vibration data calculation unit calculates first vibration data with first vibration amplitude, so that the displacement has a peak at $\theta 2$ displaced from $\theta 1$ by a predetermined value. The angle detection unit detects $\theta 3$ at which the relative displacement has a peak with the first vibration data added. A compensation data calculation unit calculates compensation data for the eccentricity of the tracks, from the detected angles $\theta 1$, $\theta 3$, the first vibration amplitude, and $\theta 2$. The position of the magnetic head is compensated according to the correction data.

18 Claims, 7 Drawing Sheets

HEAD POSITION CONTROL METHOD, HEAD POSITION CONTROL DEVICE, AND MAGNETIC RECORDING EVALUATION APPARATUS

FIELD OF THE INVENTION

The present invention relates to a head position control method for a discrete magnetic recording medium, a head position control device, and a magnetic recording evaluation apparatus for evaluating a magnetic recording medium or a magnetic head by controlling the position of the magnetic head using the head position control method.

BACKGROUND OF THE INVENTION

As a high-density recording technology for magnetic disk drives, a discrete-track magnetic disk (hereinafter referred to as DTM disk) has been developed to improve the magnetic recording characteristics by forming grooves or spaces between plural tracks concentrically formed on the disk, in order to magnetically separate the tracks from each other. In this DTM disk, the tracks are formed on the disk during the manufacturing process, so that it is inevitable that displacement, or eccentricity, occurs between the center of the tracks and the rotational center of the spindle due to an alignment error or other random errors in disk formation and attachment to the spindle.

In the DTM disk mounted on a magnetic disk drive for practical use, the eccentricity can be adjusted by servo information that is integrally formed with the tracks in the manufacturing process, or in other ways, to accurately position the magnetic head on a track. On the other hand, particularly in the initial development stage of the DTM disk, it is difficult to apply the servo controlled head positioning system, because of its strict requirements for providing servo information, a position signal demodulating circuit, a servo circuit, and adjustment of such circuits for each trial production. Thus, in most cases of the DTM disk for trial and evaluation use, only plural tracks are concentrically formed on the disk without including the servo information.

When such a DTM disk on which only tracks are formed is used for evaluating the magnetic recording characteristics by fixing the magnetic head at a predetermined position, the magnetic head crosses many tracks during one rotation of the disk due to the influence of the eccentricity. Thus, it is difficult to evaluate in a continuous area.

In order to overcome this problem, it has been proposed, for example as disclosed in Japanese Patent No. 4012057, to provide a method for compensating the position of the magnetic head. In this method, the intersection between the magnetic head and the tracks is observed from the amplitude variation of the read signal of the magnetic head. Then, the amount of eccentricity is calculated by multiplying the number of intersections by the track pitch, and the direction of the maximum interval between the intersections is determined as the eccentricity direction.

SUMMARY OF THE INVENTION

However, a reduction in the track pitch associated with increased recording density, leads to an increase in the number of intersections between the tracks and the magnetic head. Accordingly, it is necessary to increase the speed and accuracy of the intersection interval determination process for counting the number of intersections and determining the eccentricity direction. For example, when the amount of eccentricity is up to several tens μm and the track pitch is 100 nm or less, the maximum number of intersections between the magnetic head and the tracks exceeds 1000. The larger the number of intersections between the magnetic head and the tracks, the smaller the track pitch.

In addition, because the amount of eccentricity is detected by the track pitch, it has been difficult to detect and adjust the eccentricity at a pitch less than the track pitch.

The present invention provides a magnetic head position control method that can control a magnetic head to follow the track on a discrete-track magnetic disk by accurately detecting the amount of eccentricity compensation through a simple process.

The present invention provides a magnetic head position control device for executing the magnetic head position control method.

Further, the present invention provides a magnetic recording evaluation apparatus on which the magnetic head position control device is mounted.

A typical head position control method according to the present invention includes the following steps. A first step involves fixing and rotating a discrete-track magnetic recording medium on which plural tracks are concentrically formed and magnetically separate from each other onto a rotation driving mechanism, and positioning a magnetic head on the magnetic recording medium to detect a first rotation angle of the rotation driving mechanism at which the relative displacement between the magnetic head and the tracks has a peak, from the read signal of the magnetic head. A second step involves calculating first vibration data so that the relative displacement between the magnetic head and the tracks has a peak at a second rotation angle of the rotation driving mechanism, which is displaced from the first rotation angle by a predetermined angle. A third step involves adding the first vibration data to vibrate the magnetic head, and detecting a third rotation angle of the rotation driving mechanism at which the relative displacement between the magnetic head and the tracks has a peak, from the read signal of the magnetic head. A step involves calculating head position compensation data based on the first rotation angle, the second rotation angle, the third rotation angle, and the vibration amplitude of the magnetic head. A step involves compensating the position of the magnetic head according to the head position compensation data.

Further, a typical head position control device according to the present invention, includes: a rotation driving mechanism for rotating a discrete-track magnetic recording medium on which plural tracks are concentrically formed and magnetically separate from each other; a magnetic head for writing and reading signals to and from the magnetic recording medium; an actuator capable of moving the magnetic head at least in the radius direction on the magnetic recording medium; an angle detection unit for detecting a rotation angle of the rotation driving mechanism, at which the relative displacement between the magnetic head and the tracks has a peak, from the read signal of the magnetic head; a vibration data calculation unit for calculating vibration data for the actuator so that the displacement of the magnetic head, which is synchronized with the rotation of the rotation driving mechanism, has a peak at a predetermined rotation angle; a compensation data calculation unit for calculating head position compensation data, based on the rotation angle detected by the angle detection unit, as well as on the vibration data calculated and determined by the vibration data calculation unit; and a controller for controlling the operation of each of the units. The angle detection unit detects a first rotation angle of the rotation driving mechanism, at which the relative displacement between the magnetic head and the tracks has a peak, from the read signal of the magnetic head which is not vibrated yet. The vibration data calculation unit calculates first vibration data so that the relative displacement between the magnetic head and the tracks has a peak at a second rotation angle of the rotation driving mechanism, which is displaced from the first rotation angle by a predetermined angle. The actuator vibrates the magnetic head according to the first vibration data. The angle detection unit detects a third rotation angle of the rotation driving mechanism, at which the relative displacement between the magnetic head and the tracks has a peak, from the read signal of the magnetic head vibrated by the actuator according to the first vibration data. The compensation data calculation unit calculates the head position compensation data, based on the first rotation angle, the second rotation angle, the third rotation angle, and the vibration amplitude of the magnetic head. The actuator compensates the position of the magnetic head according to the head position compensation data.

Alternatively, a typical magnetic recording evaluation apparatus according to the present invention, includes: a rotation driving mechanism for rotating a discrete-track magnetic recording medium on which plural tracks are concentrically formed and magnetically separate from each other; a magnetic head for writing and reading signals to and from the magnetic recording medium; an actuator capable of moving the magnetic head at least in the radius direction on the magnetic recording medium; an angle detection unit for detecting a rotation angle of the rotation driving mechanism, at which the relative displacement between the magnetic head and the tracks has a peak, from the read signal of the magnetic head; a vibration data calculation unit for calculating vibration data for the actuator so that the displacement of the magnetic head, which is synchronized with the rotation of the rotation driving mechanism, has a peak at a predetermined angle; a compensation data calculation unit for calculating head position compensation data, based on the rotation angle detected by the angle detection unit, as well as on the vibration data calculated and determined by the vibration data calculation unit; a controller for controlling the operation of each of the units; and an evaluation unit for writing a specific pattern to the magnetic recording medium by the magnetic head, and evaluating magnetic recording characteristics from the read signal of the specific pattern. The angle detection unit detects a first rotation angle of the rotation driving mechanism, at which the relative displacement between the magnetic head and the tracks has a peak, from the read signal of the magnetic head which is not vibrated yet. The vibration data calculation unit calculates first vibration data so that the relative displacement between the magnetic head and the tracks has a peak at a second rotation angle of the rotation driving mechanism, which is displaced from the first rotation angle by a predetermined angle. The actuator vibrates the magnetic head according to the first vibration data. The angle detection unit detects a third rotation angle of the rotation driving mechanism, at which the relative displacement between the magnetic head and the tracks has a peak, from the read signal of the magnetic head vibrated by the actuator according to the first vibration data. The compensation data calculation unit calculates the head position compensation data, based on the first rotation angle, the second rotation angle, the third rotation angle, and the vibration amplitude of the magnetic head. The actuator compensates the position of the magnetic head according to the head position compensation data. The evaluation unit writes a specific pattern to the magnetic recording medium by the magnetic head whose position is being compensated, and evaluates the magnetic recording characteristics from the read signal of the specific pattern.

According to the present invention, the amount of eccentricity is calculated, from the angle at which the relative displacement due to the eccentricity between the magnetic head and the tracks has a peak, the angle at which the relative displacement between the magnetic head and the tracks has a peak when the magnetic head is vibrated by a rotation synchronous component, and the vibration amplitude. Thus, it is possible to control the magnetic head to follow a track, by accurately detecting the amount of eccentricity compensation through a simple process, without a need to detect the number of intersections between the magnetic head and the tracks. In addition, the amount of eccentricity can be detected for one track or less, thereby allowing the magnetic head to accurately follow a track.

DETAILED DESCRIPTION OF THE PREFERRED EMBODIMENTS

Hereinafter, preferred embodiments of the present invention will be described in detail with reference to the accompanying drawings.

First Embodiment

Figure 1:
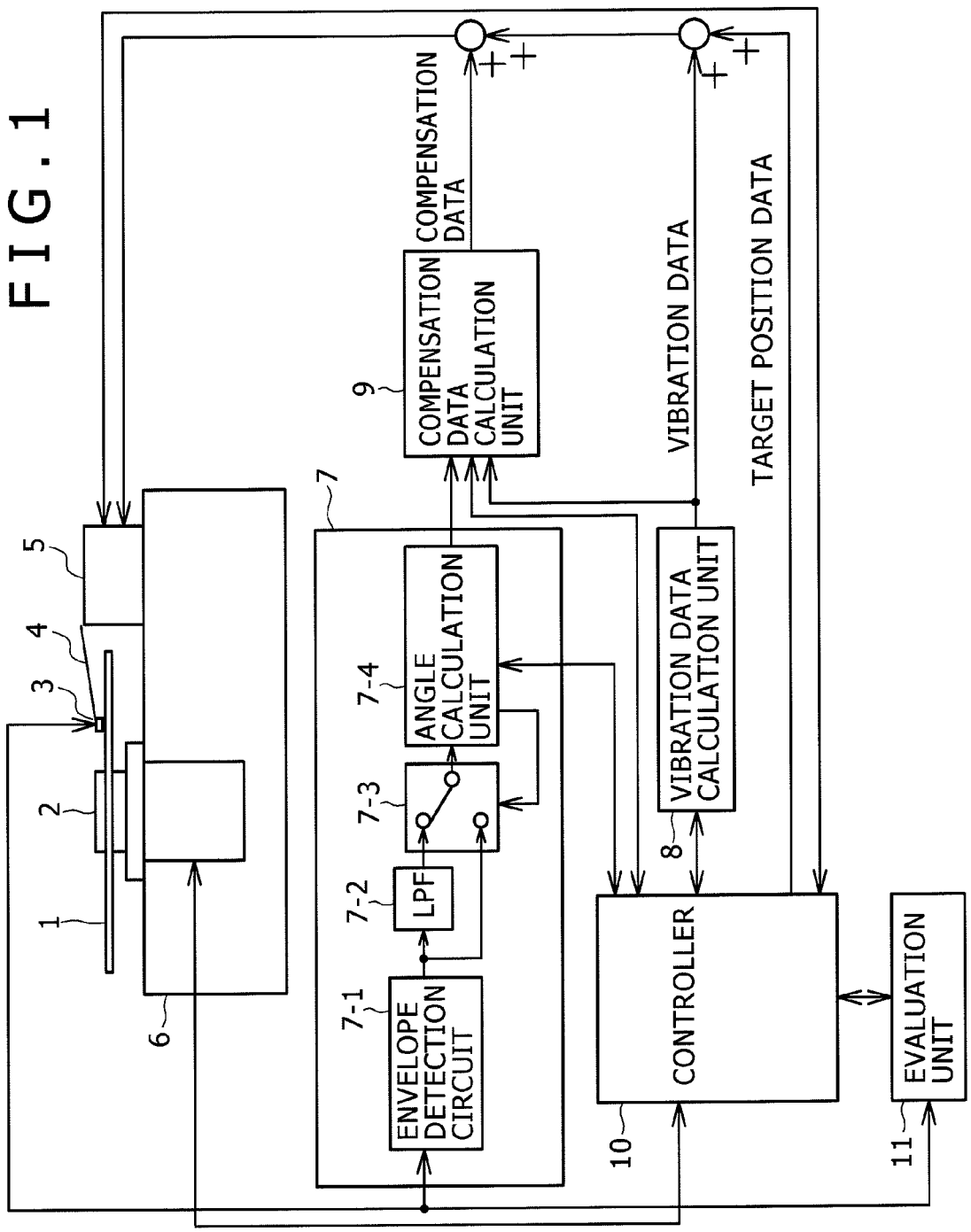
FIG. 1 is a block diagram of a magnetic recording evaluation apparatus according to a first embodiment.

FIG. 1 is a block diagram of a magnetic recording evaluation apparatus according to a first embodiment. In FIG. 1, the mechanical system of the magnetic recording evaluation apparatus includes a DTM disk 1, a spindle (rotation driving mechanism) 2, a magnetic head 3, a suspension 4, an actuator 5, and a surface plate 6. The circuit system of the magnetic recording evaluation apparatus includes an angle detection unit 7, a vibration data calculation unit 8, a compensation data calculation unit 9, a controller 10, and an evaluation unit 11.

Figure 2:
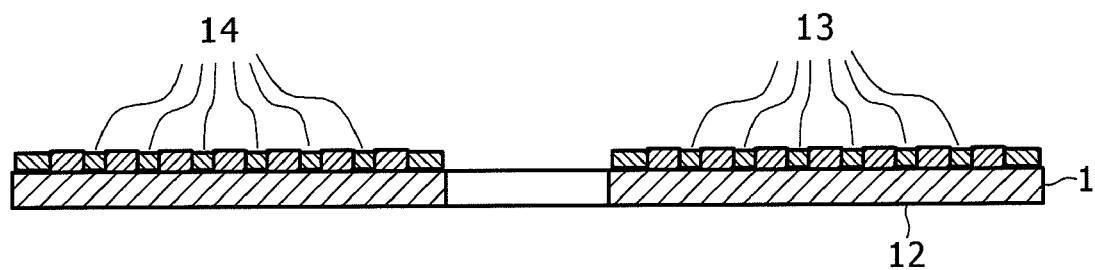
FIG. 2 is a diagram showing an example of a cross-section of a DTM disk.

The DTM disk 1 includes, as shown in FIG. 2, a substrate 12, tracks 13 having a magnetic layer on the surface thereof to keep data, and grooves 14 having no magnetic layer to magnetically separate the tracks 13. The tracks 13 and the grooves 14 are concentrically formed one after another on the substrate 12. Incidentally, in the example of FIG. 2, the grooves 14 are filled with a non-magnetic material so that the height of the grooves is substantially the same as the height of the tracks 13, by taking into account the floating characteristics of the magnetic head 3.

Now returning to FIG. 1, the DTM disk 1 is held by the spindle 2 that rotates at a fixed rotation speed in data writing or read. The magnetic head 3 is held by the actuator through the suspension 4 to write and read data to and from the DTM disk 1. The actuator 5 is driven according to the target position data output from the controller 10, in order to position the magnetic head 3 on any radius of the DTM disk 1. Incidentally, the spindle 2 and the actuator 5 are fixed on the surface plate 6 so as to be less affected by vibration from outside.

The angle detection unit 7 includes an envelope detection circuit 7-1, a low pass filter (LPF) 7-2, a switch 7-3, and an angle calculation unit 7-4. The envelope detection circuit 7-1 detects and outputs the envelope of the read signal output from the magnetic head 3. The envelope waveform output from the envelope detection circuit 7-1 is divided into two waveforms. One of the two waveforms is input to LPF 7-2 in which the high frequency component is cut off. Then, the two waveforms are input to the switch 7-3. The switch 7-3 selects the envelope waveform to be input to the angle calculation unit 7-4, based on whether the envelope waveform is passed through LPF-7-2 by a signal from the angle calculation unit 7-4. The angle calculation unit 7-4 calculates and outputs the rotation angle of the spindle 2 at which the relative displacement between the magnetic head 3 and the tracks 13 (hereinafter referred to as the relative displacement) has a peak, from the input envelope waveform.

The vibration data calculation unit 8 calculates and outputs the vibration data for the actuator 5 to displace the magnetic head 3 in the radius direction synchronized with the rotation of the spindle 2. The compensation data calculation unit 9 outputs the compensation data for the actuator 5 to compensate the position of the magnetic head 3, based on the angle data from the angle detection unit 7, as well as the on vibration data from the vibration data calculation unit 8. The controller 10 controls the operation of each of the spindle 2, actuator 5, angle detection unit 7, vibration data calculation unit 8, and compensation data calculation unit 9.

The evaluation unit 11 confirms that the magnetic head 3 is subjected to position control according to the compensation data, by a signal from the controller 10. Then, the evaluation unit 11 writes an evaluation pattern (a specific pattern) to the DTM disk 1 by the magnetic head 3, and evaluates the magnetic recording characteristics from the read signal of the specific pattern. Further, in response to a signal from the controller 10, the evaluation unit 11 generates a writing signal for erasing the measurement area and writing a burst signal for angle detection, and outputs the signal to the magnetic head 3.

With the configuration as described above, in a state in which vibration data is not added, the angle detection unit 7 detects an angle $\theta 1$ (first rotation angle) at which the relative displacement due to the eccentricity of the tracks 13 has a peak. Then, the vibration data calculation unit 8 calculates vibration data (first vibration data) with a vibration amplitude Pv1, so that the displacement of the magnetic head 3 has a peak at an angle $\theta 2$ (second rotation angle) displaced from the angle $\theta 1$ by a predetermined angle. Next, the vibration data is added to drive the actuator 5 with the vibration data added. The angle detection unit 7 detects an angle $\theta 3$ (third rotation angle) at which the relative displacement has a peak in this state. The compensation data calculation unit 9 calculates compensation data for the eccentricity of the tracks 13, based on the angles $\theta 1$, $\theta 3$ from the angle detection unit 7, as well as on the vibration amplitude Pv1 and the angle $\theta 2$ from the vibration data calculation unit 8. Further, the compensation data is added to drive the actuator 5, thereby allowing the magnetic head 3 to be positioned on one single track 13 regardless of the eccentric state of the tracks 13.

Incidentally, the angles $\theta 1$ to $\theta 3$ are the rotation angles of the spindle 2. Each of the angle values is detected synchronously with an input signal, which is, for example, an index signal output from an encoder included in the spindle 2 through the controller 10. Similarly, in the following description, angles represent the spindle rotation angles.

Figure 3:
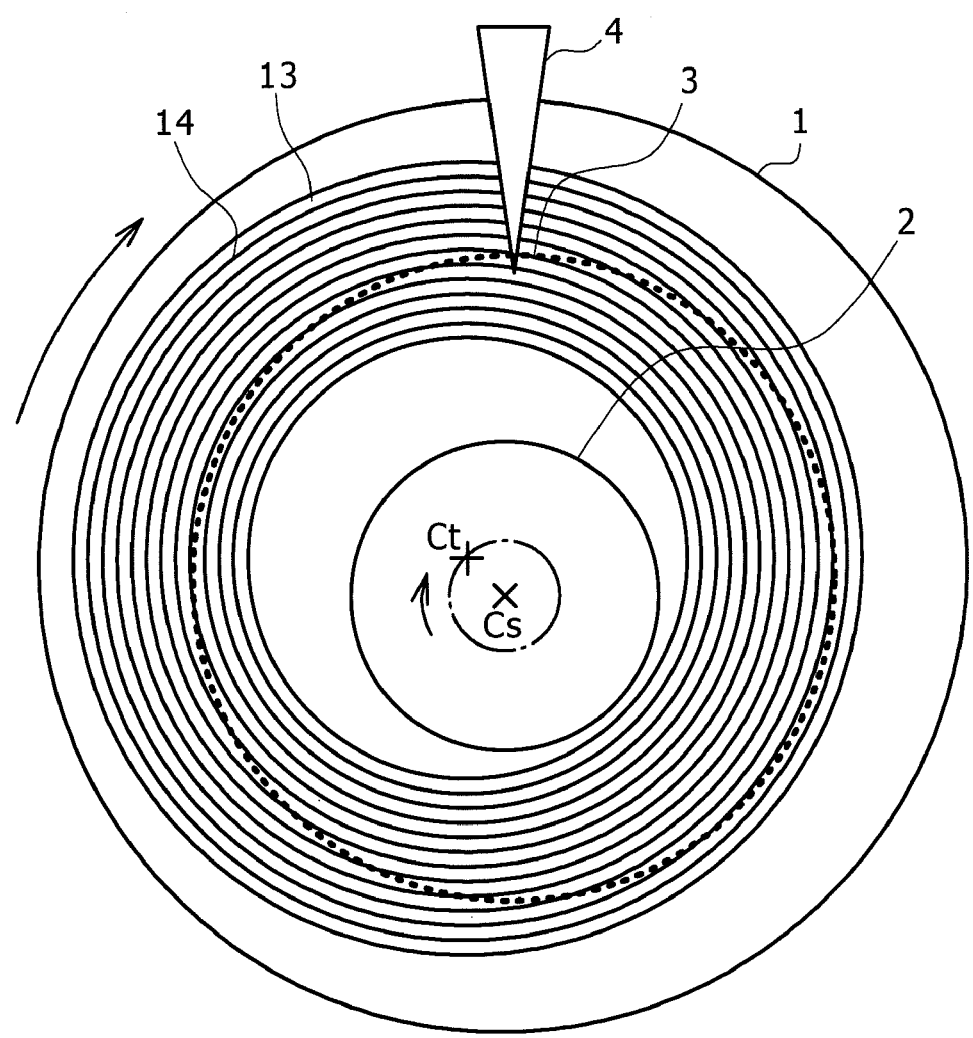
FIG. 3 is a diagram showing an example of the relationship between tracks formed on the DTM disk and a magnetic head.

FIG. 3 is a diagram showing an example of the relationship between the magnetic head 3 and the tracks 13 formed on the DTM disk 1. The tracks 13 are formed, for example, by transferring an original pattern onto the DTM disk. The center of the DTM disk 1 is displaced from the center of the tracks 13 due to mechanical tolerance or other factors during the formation of the tracks. Also upon attachment of the DTM disk 1 to the spindle 2, displacement occurs with respect to the rotation center of the spindle 2, similarly due to mechanical tolerance or other factors. As a result, the displacement between the center Ct of the tracks 13 and the rotation center Cs of the spindle 2 results in an eccentricity. The amount of the eccentricity is up to several tens μm, which is a very large value relative to, for example, a track pitch of 100 nm. In FIG. 3, the dotted line indicates the trajectory of the magnetic head 3 on the tracks 13 when the magnetic head 3 is fixed at a predetermined position. A relative displacement occurs due to the eccentricity, causing the magnetic head 3 to move over plural tracks 13. In such a state, it is difficult to evaluate in a continuous area, and thus it is necessary to compensate the head position to the eccentricity.

The relative displacement occurs due to a change in the distance between the magnetic head 3 and the center Ct of the tracks 13. The center Ct of the tracks 13 rotates about the rotation center Cs of the spindle 2 on the trajectory indicated by the dotted line in FIG. 3. Because the distance between the magnetic head 3 and the rotation center Cs of the spindle 2 is sufficiently large compared to the distance between the center Ct of the tracks 13 and the rotation center Cs of the spindle 2, the relative displacement can be approximated by a sine wave of the primary rotation.

Figure 4:
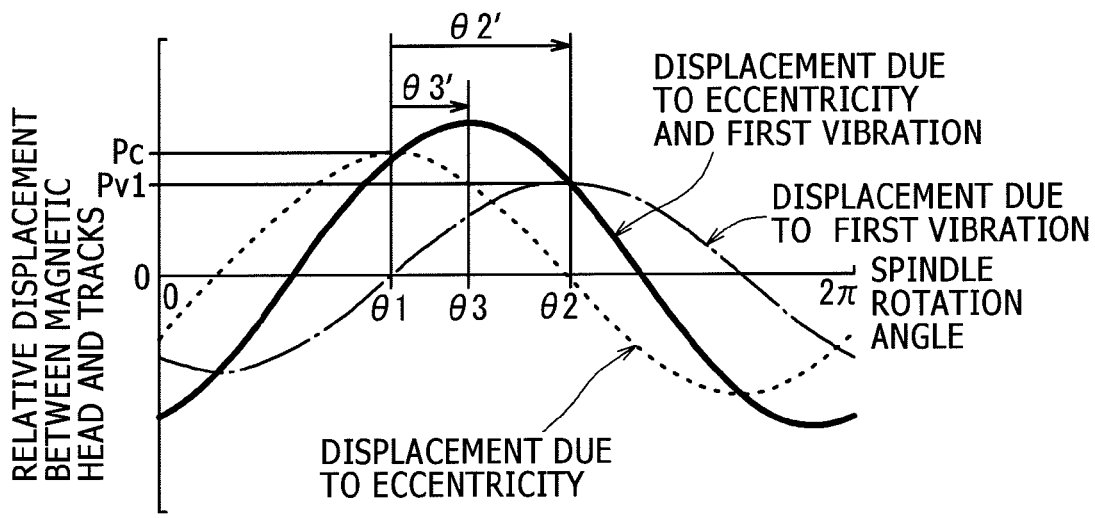
FIG. 4 is a diagram showing the relationship between the relative displacement between the magnetic head and the tracks, and the spindle rotation angle, according to the first embodiment.

FIG. 4 is a diagram showing the principle of detecting the amount of eccentricity compensation in the first embodiment. In FIG. 4, the dotted line indicates the relative displacement due to the eccentricity. In this case, the relative displacement has a peak at the angle $\theta 1$, in which the amplitude Pc is the amount of eccentricity. The peak of the relative displacement occurs at two positions in one rotation of the spindle 2, one in which the distance between the magnetic head 3 and the center Ct of the tracks 13 is the maximum (positive peak), and the other is the minimum (negative peak). In the following description, the peak is assumed to be the positive peak, unless specifically stated otherwise.

In FIG. 4, the dashed line indicates the displacement of the magnetic head 3 when the actuator 5 is driven by adding the first vibration data from the vibration data calculation unit 8. Here, the vibration amplitude of the first vibration data is Pv1, and the peak angle of the displacement is $\theta 2$. In a state in which the magnetic head 3 is vibrated by the actuator according to the first vibration data, the relative displacement results in a waveform indicated by the solid line, which is obtained by synthesizing the dotted line waveform and the dashed line waveform. Let the peak angle of the relative displacement be denoted by θ3, and let θ1 be the original point to simplify the calculation, the following relationship (equation 1) can be obtained by using θ2'=θ2−θ1, θ3'=θ3−θ1.

$$\tan\theta 3' = \frac{Pv1 \cdot \sin\theta 2'}{Pc + Pv1 \cdot \cos\theta 2'} \quad (1)$$

Modifying equation 1 as follows:

$$Pc = \left(\frac{\sin\theta 2'}{\tan\theta 3'} - \cos\theta 2'\right) \cdot Pv1 \quad (2)$$

The angles θ1, θ2 (θ2'), θ3 (θ3'), and the vibration amplitude Pv1 are known values from which Pc is calculated. Further, from θ1 and vibration amplitude Pv1 of the relative displacement, anti-phase data is derived as compensation data to compensate the relative displacement. The compensation data is added to drive the actuator 5 in order to compensate the eccentricity. Here, setting θ2'=π/2 and simplifying yields the following equation for the determination of Pc:

$$Pc = \frac{Pv1}{\tan\theta 3'} \quad (3)$$

It should focus on the fact that, because Pv1 is the amplitude added to the actuator 5, the calculated value of Pc can be obtained also as a value to be added to the actuator 5. Thus, it is possible to obtain accurate amplitude of the correction data, regardless of the variation of the characteristics of the actuator 5. In addition, because θ1 and θ3 are detected as continuous values by the angle detection unit 7, it is possible to calculate the amount of eccentricity compensation of one track or less.

Figure 5:
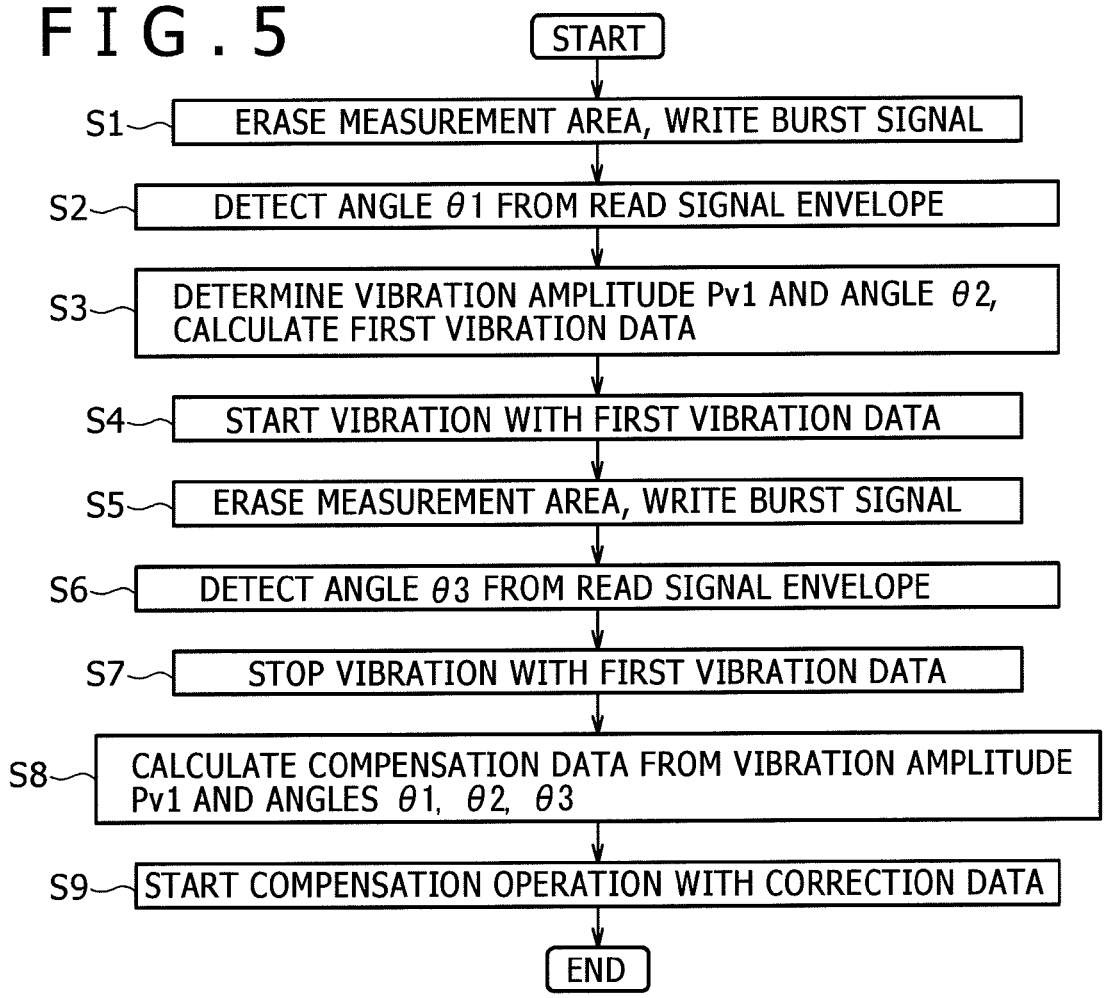
FIG. 5 is a flowchart of a head position control method according to the first embodiment.

FIG. 5 shows an example of the procedure of the eccentricity detection and compensation process according to the first embodiment. S1 to S9 indicate step numbers. First, in a state in which the vibration data is not added to the actuator 5, the measurement area is erased and a burst signal of a predetermined frequency is written for one rotation (S1). When the position of the writing element and the position of the reading element in the magnetic head 3 are displaced in the radius direction, the actuator 5 is moved by the amount of the displacement (WR offset), and the written burst signal is read to detect the angle θ1 from the envelope of the read signal by the angle detection unit 7 (S2). The first vibration amplitude is calculated by determining the angle θ2 displaced from the detected θ1 by a predetermined value (θ2'), as well as the vibration amplitude Pv1 (S3). Incidentally, θ2 is the peak angle of the actual displacement of the magnetic head 3. In the calculation of the vibration data, it is necessary to take into account the time delay (phase delay) in the circuit system and the mechanical system, which is the time from the output timing of the vibration data to the actual operation of the magnetic head 3.

Next, the first vibration data is added to start the actuator 5 (S4), and the measurement area is erased in this state while the burst signal of the predetermined frequency is written for one rotation (S5). When the WR offset exists, the actuator 5 is moved by the amount of the WR offset, and the written burst signal is read to detect the angle θ3 from the envelope of the read signal by the angle detection unit 7 (S6). Then, the vibration with the first vibration data is stopped (S7).

After that, the compensation data is calculated from the vibration amplitude Pv1 as well as the angles θ1, θ2, θ3 (S8). Then, the calculated compensation data is added to the actuator 5 to start the compensation operation (S9). Also in the calculation of the compensation data, it is necessary to take into account the phase delay in the circuit system and the mechanical system, in same way as in the calculation of vibration data.

Figure 6:
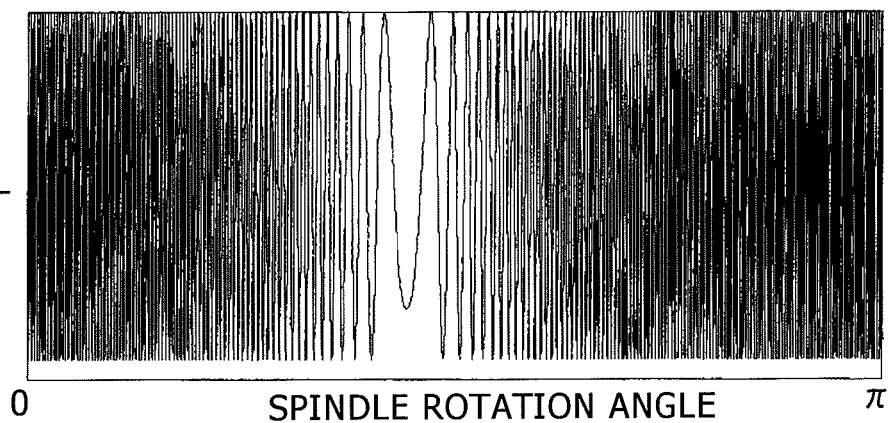
FIG. 6 is a diagram showing an example of the read signal envelope waveform.

FIG. 6 shows an example of the envelope waveform of a bust read signal when a relative displacement occurs due to the eccentricity and the vibration. The figure shows the waveform for a half rotation, because substantially the same signal can be obtained on the side opposite to the rotation angle of the spindle 2 (namely, the side rotated by π). When the magnetic head 3 is on the track 13, the envelope signal increases, and when the magnetic head 3 passes over the groove 14, the envelope signal decreases. Thus, there occur as many peaks in the envelope waveform as the number of intersections between the magnetic head 3 and the tracks 13. Further, in the vicinity of the peak angle of the relative displacement, the change of the relative displacement is slow, and the interval between the peaks of the envelope waveform increases. The peak angle of the relative displacement is found in the middle of the largest interval. Thus, in the case of the relative displacement due to the eccentricity, the detected angle corresponds to the eccentric direction. As described above, because substantially the same signal can be obtained on the side opposite to the rotation angle of the spindle 2 (namely, the side rotated by π), the peak angle of the relative displacement can be detected with the envelope waveform at least for a half rotation, without necessarily recording the bust signal for one rotation.

The estimated amount of eccentricity can be obtained by counting the number of peaks of the envelope waveform. However, when the amount of eccentricity is large compared to the track pitch, the envelope waveform changes rapidly and the number of intersections increases, thereby making it difficult to count the number of peaks of the envelope waveform. For example, the use of an analog circuit requires, in addition to increasing the frequency of the circuit, to support a wide range of amplitudes and frequencies of read signals as well as frequencies of envelope waveforms, so that various samples can be tested by the magnetic recording evaluation apparatus. Consequently, the circuit configuration is complicated. Further, when the envelope waveform is digitized by an AD converter (ADC) or other means and the digitized waveform is processed in a digital circuit, the flexibility of the process increases, but instead high-speed sampling and large-scale data processing are necessary for ADC. However, the envelope waveform changes slowly in the vicinity of the peak of the relative displacement, so that when limited to the detection of the peak angle, the detection is possible with a simple configuration without high-speed processing of the envelope waveform even if digitized. Thus, in the first embodiment, the envelope waveform is only used for detecting the peak angle of the relative displacement, and the amount of eccentricity is obtained from the changes in the detected angle due to vibration.

Figure 7:
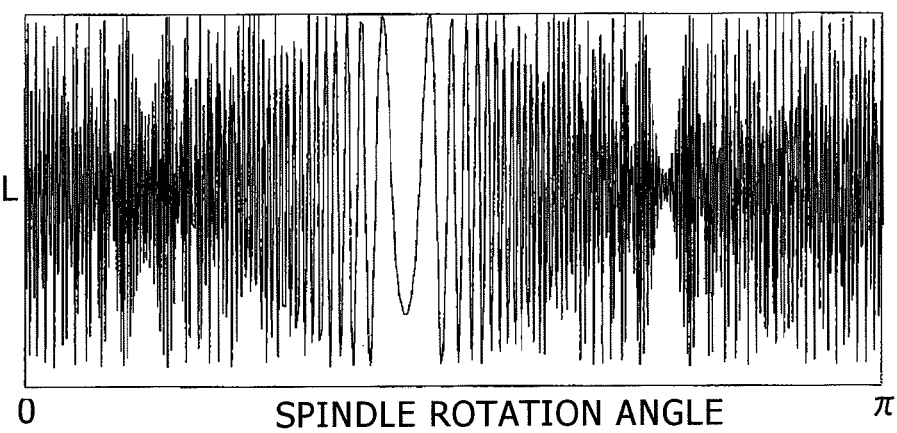
FIG. 7 is a diagram showing an example of the sampled read signal envelope waveform.

FIG. 7 shows the envelope waveform in FIG. 6 sampled at 1024 points per rotation. When the whole envelope waveform is sampled at a low sampling rate, it may be difficult to detect a portion of the maximum peak interval of the envelope waveform due to aliasing in the high frequency region of the envelope waveform, which leads to an error in the peak angle detection of the relative displacement. In order to accurately detect the peak angle of the relative displacement, for example, the envelope waveform is passed through LPF 7-2 to emphasize the low frequency component of the envelope waveform, and the portion in which the envelope waveform changes slowly is cut and used in the detection process.

Figure 8:
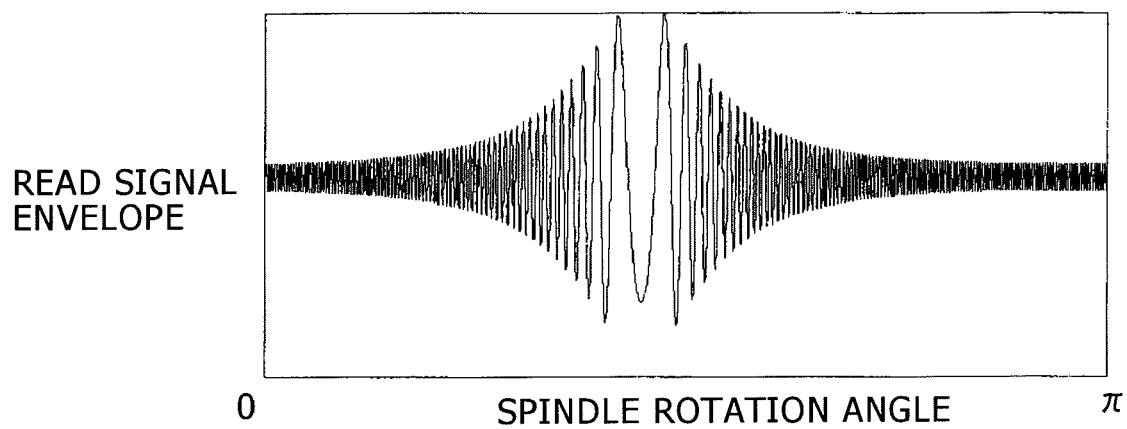
FIG. 8 is a diagram showing an example of the read signal envelope waveform passed through LPF.
Figure 9:
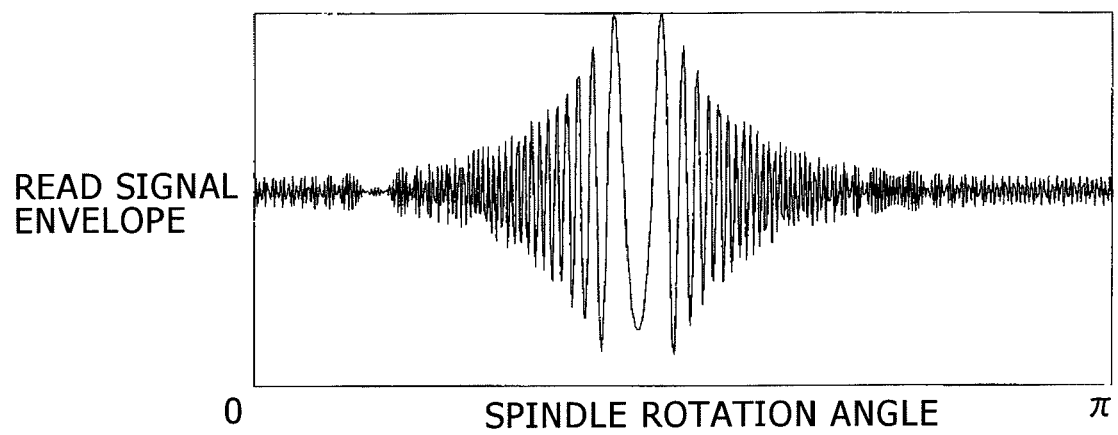
FIG. 9 is a diagram showing an example of the read signal envelope waveform sampled after being passed through LPF.

FIG. 8 shows the envelope waveform passed through LPF 7-2. FIG. 9 shows the waveform passed through LPF 7-2 and sampled at 1024 points per rotation. In FIG. 9, when the threshold is set for example to 80% of the maximum value and focusing on the portion in which the amplitude of the envelope waveform is large, it is possible to detect the peak angle even with the data of low sampling rate. Incidentally, a phase delay occurs due to LPF 7-2, leading to an error in the peak angle detection of the relative displacement. However, the phase delay due to LPF 7-2 can be estimated, and the detection error can be reduced by correcting the estimated value. Another way to suppress the influence of the phase delay of LPF 7-2 is to cut the portion of the angle area portion from the envelope waveform passed through LPF 7-2, and actually detect the peak angle from the cut portion.

Figure 10:
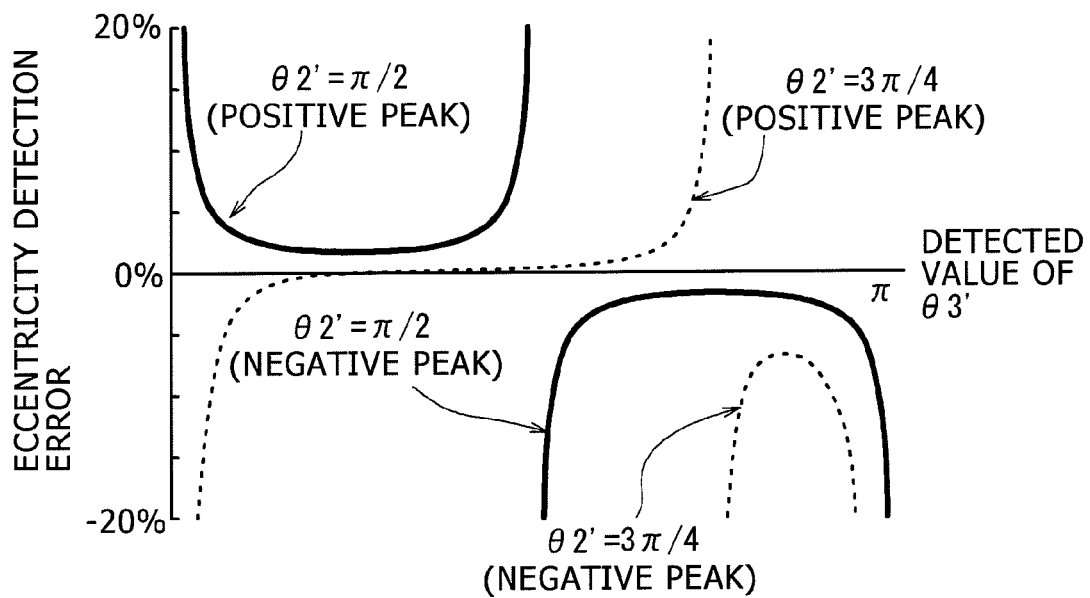
FIG. 10 is a diagram showing an example of the relationship between the detected angle $\theta 3'$ and the eccentricity detection error due to detection error of $\theta 3'$.

FIG. 10 is a diagram showing an example of the relationship between the detected angle $\theta3'$, and the detection error of the amount of eccentricity Pc occurring when $\theta3'$ is displaced by $\pi/180$. The detection error of the amount of eccentricity Pc is the smallest in the vicinity of $\theta3'=\theta2'/2$, while the detection error rapidly increases when $\theta3'$ is close to zero or $\theta2'$. Thus, the vibration amplitude Pv1 is preferably selected to satisfy Pv1≈Pc. However, if the actual value substantially deviates from the target value and $\theta3'$ is close to zero or $\theta2'$, it is necessary to reset the value of Pv1 for the measurement process.

Incidentally, the angle detection unit 7 does not, in principle, determine between the positive and negative peaks. However, in the first embodiment of the present invention, whether the peak is positive or negative can be determined with respect to the peak of the eccentricity, from the range of the value of the peak angle $\theta3'$ with the vibration added. In other words, the peak is positive when $\theta3'<\theta2'$, and the peak is negative when $\theta3'>\theta2'$.

As shown in FIG. 10, the detection error of the eccentricity Pc with the positive peak can be suppressed by taking a large value of $\theta2'$, while the detection error with the positive peak increases. Thus, when the positive peak and the negative peak are hardly distinguished from each other, it is preferable to set $\theta2'=\pi/2$ at which the detection error is the same in both cases. On the other hand, when the peak direction of the relative displacement due to the eccentricity is known after a measurement or for some other reason, the detection accuracy of the amount of eccentricity Pc can be improved by setting $\theta2'$ to an appropriate value.

As described above, in the first embodiment, since the vibration amplitude Pv1 is the amplitude of the vibration data to be added to the actuator 5, the calculated value of Pc is obtained also as the value to be added to the actuator 5. Thus, it is possible to obtain accurate amplitude of the compensation data, regardless of the variation of the characteristics of the actuator 5. Further, since $\theta1$ and $\theta3$ detected by the angle detection unit 7 are continuous values, it is possible to calculate the amount of eccentricity compensation of one track or less.

Second Embodiment

Hereinafter, a second embodiment of the present invention will be described. The configuration of the second embodiment is the same as the configuration of the first embodiment shown in FIG. 1. In the second embodiment, the angle detection unit 7 detects an angle $\theta1$ (first rotation angle) at which the relative displacement due to the eccentricity of the tracks 13 has a peak with no vibration added. The vibration data calculation unit 8 calculates vibration data (first vibration data) with a vibration amplitude Pv1, so that the displacement of the magnetic head 3 has a peak at an angle $\theta2$ (second rotation angle) displaced from the angle $\theta1$ by a predetermined angle. Next, the vibration data is added to drive the actuator 5. The angle detection unit 7 detects an angle $\theta3$ (third rotation angle) at which the relative displacement has a peak with the vibration added by the actuator 5. Further, the vibration data calculation unit 8 calculates vibration data (second vibration data) with a vibration amplitude Pv2, so that the displacement of the magnetic head 3 has a peak at an angle of $\theta4$ (fourth rotation angle), which is different from $\theta2$ and displaced from the angle $\theta1$ by a predetermined angle. Then, the vibration data is added to drive the actuator 5. The angle detection unit 7 detects an angle $\theta5$ (fifth rotation angle) at which the relative displacement has a peak with the vibration added. The compensation data calculation unit 9 calculates compensation data for the eccentricity of the tracks 13, based on the angles $\theta1$, $\theta3$, $\theta5$ from the angle detection unit 7, as well as on the vibration amplitudes Pv1 and Pv2 from the vibration data calculation unit 8. Then, the compensation data is added to drive the actuator 5, thereby allowing the magnetic head 3 to be positioned on one single track 13 regardless of the eccentric state of the tracks 13.

Figure 11:
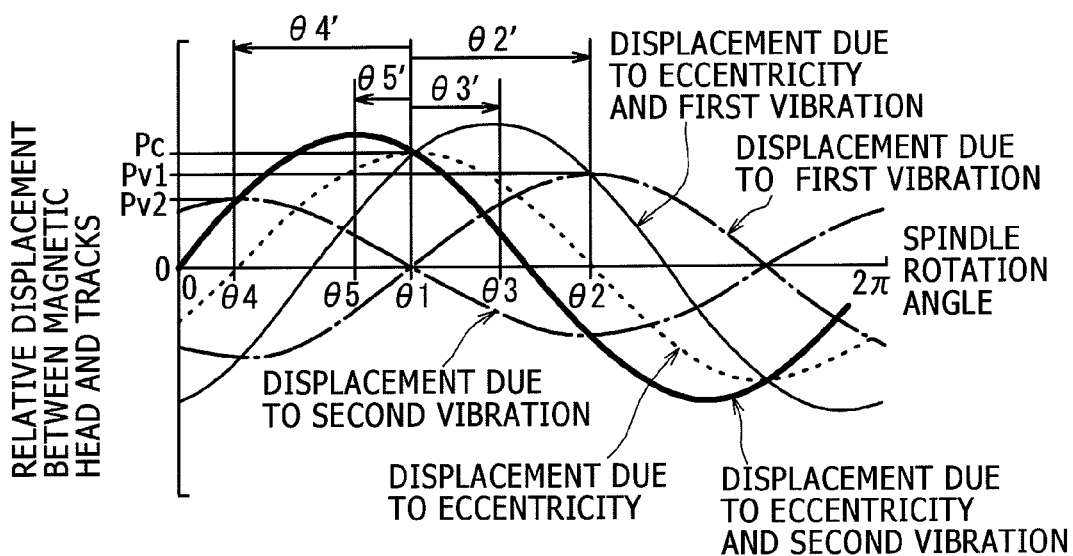
FIG. 11 is a diagram showing the relationship between the relative displacement between the magnetic head and the tracks, and the spindle rotation angle, according to a second embodiment.

FIG. 11 is a diagram showing the principle of detecting the amount of eccentricity compensation. In FIG. 11, the dotted line indicates the relative displacement due to the eccentricity. In this case, the relative displacement has a peak at the angle $\theta1$, and the amplitude Pc is the amount of eccentricity. The two dotted lines indicate the displacements of the magnetic head 3 when the actuator 5 is driven by adding the first vibration data and second vibration data, respectively, from the vibration data calculation unit 8. Here, the vibration amplitude of the first vibration data is Pv1 and the peak angle of the displacement is $\theta2$, the vibration amplitude of the second vibration data is Pv2 and the peak angle of the displacement is $\theta4$. When the magnetic head 3 is vibrated under such conditions, the relative displacements result in the waveforms indicated by the solid lines, which are synthesized from the dotted line waveform and the respective dashed line waveforms. At this time, the peak angles of the relative displacement are defined as $\theta3$ and $\theta5$.

Here, $\theta2$ and $\theta4$ are the peak angles of the actual displacements of the magnetic head 3. It is necessary to take into account the phase delay in the circuit system and the mechanical system with respect to the peaks of the vibration data. The phase delay varies depending on the apparatus, vibration amplitude, and vibration frequency, or other conditions. Thus, in the second embodiment, $\theta2$ and $\theta4$ are assumed to be unknown and their values are first obtained. Note that the phase delays in the first and second vibrations are equal to each other, and that $\delta=\theta4-\theta2$ is a known value. Let $\theta1$ be the original point to simplify the calculation. Then using $\theta2'=\theta2-$ $\theta 1$, $\theta 3'=\theta 3-\theta 1$, $\theta 4'=\theta 4-\theta 1$, and $\theta 5'=\theta 5-\theta 1$, the following relationship (equation 4) can be obtained, in addition to equation 1.

$$\tan\theta 5' = \frac{Pv2 \cdot \sin\theta 4'}{Pc + Pv2 \cdot \cos\theta 4'} \quad (4)$$

From equations (1), (4) and the relationship $\delta = \theta 4 - \theta 2$:

$$\tan\theta 2' = \frac{Pv1 \cdot \tan\theta 3' \cdot \tan\theta 5' - Pv2 \cdot \tan\theta 3' \cdot \cos\delta \cdot \tan\theta 5' + Pv2 \cdot \tan\theta 3' \cdot \sin\delta}{Pv1 \cdot \tan\theta 5' - Pv2 \cdot \tan\theta 3' \cdot \cos\delta - Pv2 \cdot \tan\theta 3' \cdot \sin\delta \cdot \tan\theta 5'} \quad (5)$$

Since the angles $\theta 1$, $\theta 3$ ($\theta 3'$), $\theta 5$ ($\theta 5'$), $\delta$, and the vibration amplitudes Pv1, Pv2 are all known, $\theta 2$ ($\theta 2'$) is calculated from these values. Next, substituting the obtained value of $\theta 2$ ($\theta 2'$) and $\theta 3$ ($\theta 3'$) into equation (2) yields the amplitude of eccentricity Pc. Then, from $\theta 1$ and the vibration amplitude Pv1, anti-phase data is derived as compensation data so as to compensate the variability. The compensation data is added to drive the actuator 5, and thus the eccentricity can be compensated. Here, setting $\delta = \pi$:

$$\tan\theta 2' = \frac{(Pv1 + Pv2) \cdot \tan\theta 3' \cdot \tan\theta 5'}{Pv2 \cdot \tan\theta 3' + Pv1 \cdot \tan\theta 5'} \quad (6)$$

Further, setting Pv1=Pv2 and simplifying yields the following equation for the determination of Pc:

$$\tan\theta 2' = \frac{2 \cdot \tan\theta 3' \cdot \tan\theta 5'}{\tan\theta 3' + \cdot \tan\theta 5'} \quad (7)$$

Figure 12:
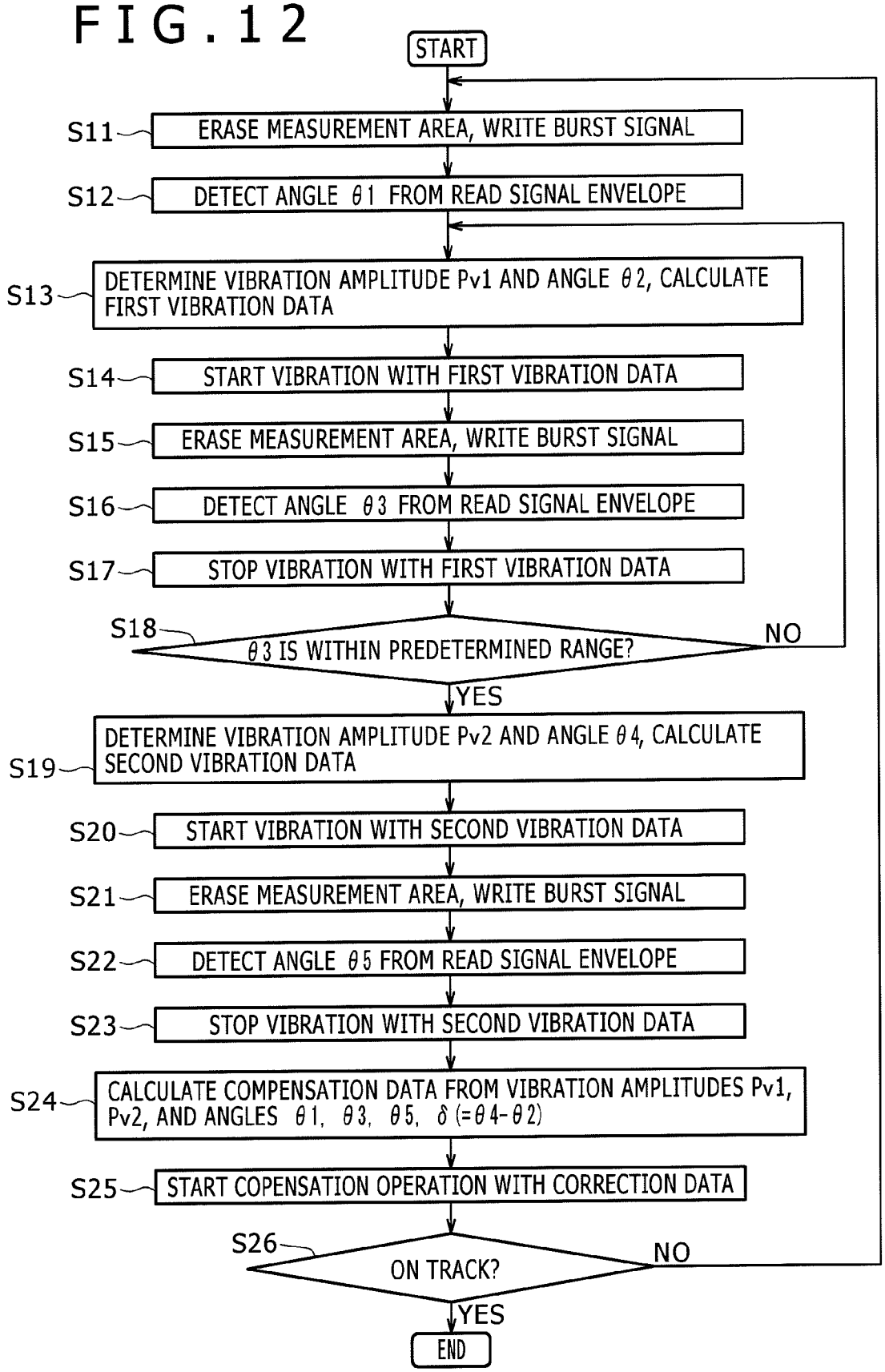
FIG. 12 is a flowchart of a head position control method according to the second embodiment.

FIG. 12 shows an example of the procedure of eccentricity detection and compensation process according to the second embodiment. S11 to S26 indicate step numbers. First, in a state in which the vibration data is not added to the actuator 5, the measurement area is erased and a burst signal of a predetermined frequency is written for one rotation (S11). When the position of the writing element and the position of the reading element in the magnetic head 3 are displaced in the radius direction, the actuator 5 is moved for the amount of the displacement (WR offset), and the written burst signal is read. Then, the angle $\theta 1$ is detected from the envelope of the read signal by the angle detection unit 7 (S12). The first vibration data is calculated by determining the angle $\theta 2$ displaced from the detected $\theta 1$ by a predetermined value ($\theta 2'$), as well as the vibration amplitude Pv1 (S13).

Next, the first vibration data is added to the actuator 5 to start vibration (S14). In this state, the measurement area is erased and a burst signal of a predetermined frequency is written for one rotation (S15). When the WR offset exists, the actuator 5 is moved for the amount of the WR offset, and the written burst signal is read. Then, the angle $\theta 3$ is detected from the envelope of the read signal by the angle detection unit 7 (S16), and the vibration with the first vibration data is stopped (S17). When $\theta 3$ is not within the predetermined range (S18), the process is started again from the calculation of the first vibration data (S13).

When $\theta 3$ is within the predetermined range (S18), the second vibration data is calculated by determining the angle $\theta 4$ displaced from $\theta 1$ by a predetermined value ($\theta 4'$), as well as the vibration amplitude Pv2 (S19). The second vibration data is added to the actuator 5 to start vibration (S20). In this state, the measurement area is erased, and a burst signal of a predetermined frequency is written for one rotation (S21). When the WR offset exists, the actuator 5 is moved for the amount of the WR offset, and the written burst signal is read. Then, the angle $\theta 5$ is detected from the envelope of the read signal by the angle detection unit 7 (S22), and the vibration with the second vibration data is stopped (S23).

After that, the compensation data is calculated from the vibration amplitudes Pv1, Pv2, as well as the angles $\theta 1$, $\theta 3$, $\theta 5$, and $\delta$ ($\theta 4 - \theta 2$) (S24). The calculated compensation data is added to the actuator 5 to start the compensation operation (S25). The on-track state is observed while the compensation operation is performed. When the magnetic head is not sufficiently on-track (S26), the compensation process is started again from the beginning (S11) with respect to the eccentricity compensation residual error, while the current compensation operation is maintained. When the magnetic head is sufficiently on-track (S26), the process is completed.

In the second embodiment, it is possible to increase the calculation accuracy of the amplitude of the eccentricity Pc by checking the value of $\theta 3$ (S18). It is also possible to improve the accuracy of the eccentricity compensation, by repeating the eccentricity detection and compensation operations with respect to the eccentricity compensation residual error, based on checking the on-track state of the magnetic head (S26).

As described above, in the second embodiment, the use of the calculated $\theta 2$ ($\theta 2'$) can eliminate the influence of the variation of the phase delay in the circuit system and the mechanical system, in addition to the influence of the characteristic variation of the actuator 5. As a result, accurate amplitude of the compensation data can be obtained. Further, even if the actuator 5 has hysteresis characteristics that can be approximated as the phase delay, the hysteresis characteristics can be included in the calculation of $\theta 2$ ($\theta 2'$) and their influence can be reduced.

While in the second embodiment both the value of $\theta 3$ and the on-track state are checked in steps S18 and S26, either of the two steps may be performed. It is also possible to perform such checks in the first embodiment.

In the above described embodiments, the angle detection unit 7 performs the angle detection from the envelope waveform of the burst signal. However, the angle detection unit 7 may write a pattern other than the burst signal, or may perform DC erase instead of writing a specific signal, to detect the angle from the output waveform. Incidentally, when the range used for the eccentricity detection of the DTM disk 1 is initialized by the burst signal, specific pattern, or DC erase and the like, there is no need to perform the erase operation and the writing operation for outputting the read signal before the angle detection (S1, S5, S11, S15, and S21).

Further, in the above described embodiments, the envelope waveform for at least a half rotation is enough to detect the peak angle of the relative displacement by the angle detection unit 7. Thus, the tracks 13 and the grooves 14 are not necessarily formed on the entire circumference of the disk, and may be continuously formed on at least half or more than half the circumference of the disk.

It is also possible that the tracks 13 and the grooves 14 are continuously formed on a portion of the DTM disk 1 as an eccentricity detection part, and that a test pattern is formed on the rest of the DTM disk 1.

Further, the above described embodiments have focused on the eccentricity involved in the detection and correction of the primary rotation component of the spindle 2. However, in the DTM disk 1, a secondary or higher order rotation component may occur due to distortion or shifting of the tracks 13, which may be the main cause of the eccentricity. In such a case, it is also possible to reduce the secondary or higher order rotation component by the same procedure as in the case of the eccentricity of the primary rotation.

Further, in the above described embodiments, all or part of the angle calculation unit 7-4, the vibration data calculation unit 8, the compensation data calculation unit 9, and the controller 10 may be combined with a microprocessor, an AD converter, a DA converter, and the like.

It is to be noted that even in the case of the DTM disk on which servo information is recorded in advance, the present invention can be applied to detect the peak angle of the relative displacement by using the demodulated signal of the servo information.

In addition, the present invention can be applied to not only the DTM disk, but also bit patterned media (BPM) disks in which non-magnetic regions exist between tracks similarly to the DTM disk.

What is claimed is:

1. A head position control method comprising:
    a first step of fixing and rotating a discrete-track magnetic recording medium on which a plurality of tracks are concentrically formed and magnetically separate from each other onto a rotation driving mechanism, positioning a magnetic head on the magnetic recording medium, and detecting a first rotation angle of the rotation driving mechanism at which the relative displacement between the magnetic head and the tracks has a peak, from the read signal of the magnetic head;
    a second step of calculating first vibration data so that the relative displacement between the magnetic head and the tracks has a peak at a second rotation angle of the rotation driving mechanism, which is displaced from the first rotation angle by a predetermined angle;
    a third step of adding the first vibration data to vibrate the magnetic head, and detecting a third rotation angle of the rotation driving mechanism at which the relative displacement between the magnetic head and the tracks has a peak, from the read signal of the magnetic head;
    a step of calculating head position compensation data based on the first rotation angle, the second rotation angle, the third rotation angle, and the vibration amplitude of the magnetic head; and
    a step of compensating the position of the magnetic head according to the head position compensation data.

2. The head position control method according to claim 1, wherein the step of calculating the head position compensation data involves calculating the head position compensation data from $(\sin \theta 2'/\tan \theta 3' - \cos \theta 2') \times Pv1$, assuming that the first rotation angle is $\theta 1$, the second rotation angle is $\theta 2$, the third rotation angle is $\theta 3$, $\theta 2 - \theta 1 = \theta 2'$, $\theta 3 - \theta 1 = \theta 3'$, and the first vibration data is $Pv1$.

3. The head position control method according to claim 2, wherein $\theta 2'$ is set to $\pi/2$.

4. The head position control method according to claim 1, wherein the first and third steps involve emphasizing a low frequency component of an envelope waveform of the read signal of the magnetic head, and detecting a peak angle of the relative displacement that corresponds to the middle of the maximum peak interval of the envelope waveform whose low frequency component is emphasized.

5. The head position control method according to claim 4, wherein the envelope waveform whose low frequency component is emphasized is sampled to detect the peak angle of the relative displacement that corresponds to the portion of the sampled envelope waveform exceeding a predetermined threshold.

6. The head position control method according to claim 1, wherein the first and third steps involve emphasizing the low frequency component of the envelope waveform of the read signal of the magnetic head, determining an angle area to be used for detecting the peak angle of the relative displacement between the magnetic head and the tracks from the envelope waveform whose low frequency component is emphasized, cutting the portion of the angle area from the envelope waveform of the read signal of the magnetic head, and detecting the peak angle of the relative displacement between the magnetic head and the tracks.

7. The head position control method according to claim 1, wherein the first step includes a step of writing a detection signal to the area of the magnetic recording medium in which the position of the magnetic head is determined.

8. The head position control method according to claim 7, wherein the third step includes a step of erasing the area of the magnetic recording medium in which the position of the magnetic head is determined, and writing another detection signal.

9. The head position control method according to claim 1, wherein the detection signal is written on the track of the magnetic recording medium, from which the detection signal is read by the magnetic head in the first and third steps.

10. The head position control method according to claim 1, further comprising, after the third step:
    a fourth step of calculating second vibration data so that the relative displacement between the magnetic head and the tracks has a peak at a fourth rotation angle of the rotation driving mechanism, which is different from the second rotation angle and displaced from the first rotation angle by a predetermined angle; and
    a fifth step of adding the second vibration data to vibrate the magnetic head, and detecting a fifth rotation angle of the rotation driving mechanism at which the relative displacement between the magnetic head and the tracks has a peak, from the read signal of the magnetic head,
    wherein the step of calculating the head position compensation data involves calculating the head position compensation data, based on the first rotation angle, the second rotation angle, the third rotation angle, the fourth rotation angle, the fifth rotation angle, the vibration amplitude of the first vibration data, and the vibration amplitude of the second vibration data.

11. The head position control method according to claim 10, further comprising, after the third step,
    a step of determining whether the third rotation angle is within a predetermined range, and starting again from the second step when the third rotation angle is not within the predetermined range.

12. The head position control method according to claim 10, further comprising, after the step of correcting the position of the magnetic head,
    a step of determining whether the magnetic head is on track, and starting again from the first step with respect to the compensation residual error when the magnetic head is not sufficiently on track.

13. The head position control method according to claim 1, further comprising, after the third step,
a step of determining whether the third rotation angle is within a predetermined range, and starting again from the second step when the third rotation angle is not within the predetermined range.

14. The head position control method according to claim 1, further comprising, after the step of correcting the position of the magnetic head,
a step of determining whether the magnetic head is on track, and starting again from the first step with respect to a compensation residual error when the magnetic head is not sufficiently on track.

15. A head position control device comprising:
a rotation driving mechanism for rotating a discrete-track magnetic recording medium on which a plurality of tracks are formed and magnetically separate from each other;
a magnetic head for writing and reading signals to and from the magnetic recording medium;
an actuator capable of moving the magnetic head at least in the radius direction on the magnetic recording medium;
an angle detection unit for detecting a rotation angle of the rotation driving mechanism, at which the relative displacement between the magnetic head and the tracks has a peak, from the read signal of the magnetic head;
a vibration data calculation unit for calculating vibration data for the actuator so that the displacement of the magnetic head, which is synchronized with the rotation of the rotation driving mechanism, has a peak at a predetermined rotation angle;
a compensation data calculation unit for calculating head position compensation data, based on the rotation angle detected by the angle detection unit, as well as on the vibration data calculated and determined by the vibration data calculation unit; and
a controller for controlling the operation of each of the units,
wherein the angle detection unit detects a first rotation angle of the rotation driving mechanism, at which the relative displacement between the magnetic head and the tracks has a peak, from the read signal of the magnetic head which is not vibrated yet,
wherein the vibration data calculation unit calculates first vibration data so that the relative displacement between the magnetic head and the tracks has a peak at a second rotation angle of the rotation driving mechanism, which is displaced from the first rotation angle by a predetermined angle,
wherein the actuator vibrates the magnetic head according to the first vibration data,
wherein the angle detection unit detects a third rotation angle of the rotation driving mechanism, at which the relative displacement between the magnetic head and the tracks has a peak, from the read signal of the magnetic head vibrated by the actuator according to the first vibration data,
wherein the compensation data calculation unit calculates the head position compensation data, based on the first rotation angle, the second rotation angle, the third rotation angle, and the vibration amplitude of the magnetic head, and
wherein the actuator compensates the position of the magnetic head according to the head position compensation data.

16. The head position control device according to claim 15, wherein, after the angle detection unit detects the third rotation angle, the vibration data calculation unit also calculates second vibration data so that the relative displacement between the magnetic head and the tracks has a peak at a fourth rotation angle of the rotation driving mechanism, which is different from the second rotation angle and displaced from the first rotation angle by a predetermined angle,
wherein the actuator vibrates the magnetic head according to the second vibration data,
wherein the angle detection unit detects a fifth rotation angle of the rotation driving mechanism at which the relative displacement between the magnetic head and the tracks has a peak, from the read signal of the magnetic head vibrated by the actuator according to the second vibration data, and
wherein the compensation data calculation unit calculates head position compensation data, based on the first rotation angle, the second rotation angle, the third rotation angle, the fourth rotation angle, the fifth rotation angle, the vibration amplitude of the first vibration data, and the vibration amplitude of the second vibration data.

17. A magnetic recording evaluation apparatus comprising:
a rotation driving mechanism for rotating a discrete-track magnetic recording medium on which a plurality of tracks are concentrically formed and magnetically separate from each other;
a magnetic head for writing and reading signals to and from the magnetic recording medium;
an actuator capable of moving the magnetic head at least in the radius direction on the magnetic recording medium;
an angle detection unit for detecting a rotation angle of the rotation driving mechanism, at which the relative displacement between the magnetic head and the tracks has a peak, from the read signal of the magnetic head;
a vibration data calculation unit for calculating vibration data for the actuator so that the displacement of the magnetic head, which is synchronized with the rotation of the rotation driving mechanism, has a peak at a predetermined angle;
a compensation data calculation unit for calculating head position compensation data, based on the rotation angle detected by the angle detection unit, as well as on the vibration data calculated and determined by the vibration data calculation unit;
a controller for controlling the operation of each of the units; and
an evaluation unit for writing a specific pattern to the magnetic recording medium by the magnetic head, and evaluating magnetic recording characteristics from the read signal of the specific pattern,
wherein the angle detection unit detects a first rotation angle of the rotation driving mechanism, at which the relative displacement between the magnetic head and the tracks has a peak, from the read signal of the magnetic head which is not vibrated yet,
wherein the vibration data calculation unit calculates first vibration data so that the relative displacement between the magnetic head and the tracks has a peak at a second rotation angle of the rotation driving mechanism, which is displaced from the first rotation angle by a predetermined angle,
wherein the actuator vibrates the magnetic head according to the first vibration data, wherein the angle detection unit detects a third rotation angle of the rotation driving mechanism, at which the relative displacement between the magnetic head and the tracks has a peak, from the read signal of the magnetic head vibrated by the actuator according to the first vibration data, wherein the compensation data calculation unit calculates the head position compensation data, based on the first rotation angle, the second rotation angle, the third rotation angle, and the vibration amplitude of the magnetic head, wherein the actuator compensates the position of the magnetic head according to the head position compensation data, and wherein the evaluation unit writes the specific pattern to the magnetic recording medium by the magnetic head whose position is being compensated, and evaluates the magnetic recording characteristics from the read signal of the specific pattern.

18. The magnetic recording evaluation apparatus according to claim 17, wherein, after the angle detection unit detects the third rotation angle, the vibration data calculation unit also calculates second vibration data so that the relative displacement between the magnetic head and the tracks has a peak at a fourth rotation angle of the rotation driving mechanism, which is different from the second rotation angle and displaced from the first rotation angle by a predetermined angle, wherein the actuator vibrates the magnetic head according to the second vibration data, wherein the angle detection unit detects a fifth rotation angle of the rotation driving mechanism, at which the relative displacement between the magnetic head and the tracks has a peak, from the read signal of the magnetic head vibrated by the actuator according to the second vibration data, and wherein the compensation data calculation unit calculates head position compensation data, based on the first rotation angle, the second rotation angle, the third rotation angle, the fourth rotation angle, the fifth rotation angle, the vibration amplitude of the first vibration data, and the vibration amplitude of the second vibration data.

* * * * *